United States Patent Office 2,879,207
Patented Mar. 24, 1959

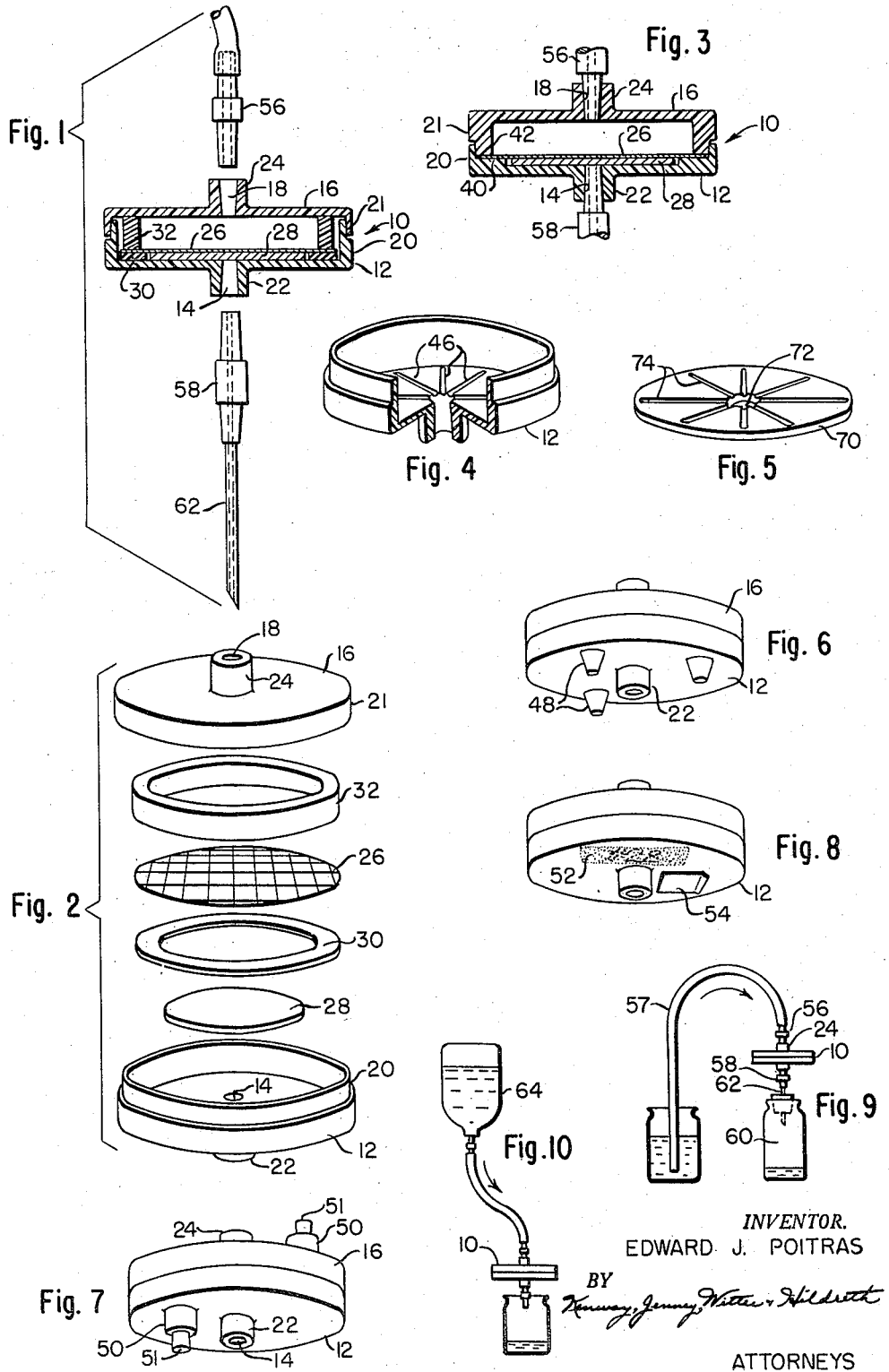

2,879,207

FILTRATION AND INCUBATION UNIT

Edward J. Poitras, Holliston, Mass., assignor to Millipore Filter Corporation, Watertown, Mass., a corporation of Massachusetts Application November 22, 1954, Serial No. 470,169

10 Claims. (Cl. 195—139)

The present invention comprises a novel unit for bacterial analysis of such construction that a sample to be analyzed may be filtered to collect the micro-organisms present, the culture medium added, and the organisms incubated, all without manipulating the filter or otherwise exposing it to possible contamination.

An important use of the bacterial analysis unit of this invention is in public health work where it is frequently necessary to test water sources in the field rapidly and efficiently to determine their safety. It has been the practice in testing water to collect liter samples in sealed containers, then to refrigerate them and transport them to a laboratory where they are filtered and the bacteria are cultured. A recent improvement consists in utilizing small plastic hermetically sealed dishes in conjunction with portable filtering apparatus whereby filtration of the samples is carried out in the field and the filter membrane then placed and sealed in the dish, conveniently one provided with a supporting pad for the filter saturated with a nutrient medium whereby incubation may proceed during the time the sample is in transit to its final examination. A disadvantage of this technique, however, is the possibility of contaminating the filter with extraneous organisms, particularly when the field work is under relatively septic conditions. Also, most suitable filter materials are quite fragile and delicate and their transfer from the filter apparatus to the dishes requires considerable care, particularly if an underlying pad of nutrient medium is provided against which the filter must make complete face to face contact.

The bacterial analysis unit of this invention avoids the difficulties in previous techniques by providing in a single container for both filtration and incubation of micro organism specimens, thus eliminating all need for any manipulation of the filter, avoiding any danger of extraneous contamination, and obviating the necessity of separate filtering apparatus. In use a sample to be analyzed is flowed through the unit, and the nutrient medium is then introduced and the unit sealed preparatory to incubation which is carried out in the sealed unit.

In general, the bacterial analysis unit of this invention comprises an enclosed container, conveniently in the form of a flat circular box, having a bottom and top each tapped to provide for the introduction of the sample and removal of the filtrate through suitable connections. Against the bottom of the box is a porous supporting pad, or other supporting structure providing drainage, on which rests a filter film held in place in face-to-face contact with the supporting pad by an annular member engaging the top surface of the film at its marginal edges. When assembled, and prior to use, the inlet and outlet taps in the bottom and top are preferably sealed, and the unit may then be sterilized and stored in a sterile condition until ready for use.

With a unit of this construction, the sample to be tested is passed, by suitable connections, through the inlet in the top, and drained from the outlet in the bottom. In passing through the unit the micro-organisms originally present in the sample are filtered out and collected on the filter where they are cultured by introducing a culture medium through the outlet port in the bottom to saturate the porous supporting pad and feed through the overlying filter film. The inlet and outlet ports are then sealed and the unit is ready for incubation.

The filter film is preferably a microporous membrane suitable for removing bacteria and other micro organisms and retaining them on the outer surface. A satisfactory filter film is described in U.S. Patent No. 1,421,341, issued June 27, 1922, as being made by dissolving a cellulose ester in a solvent and evaporating the solution to dryness in a humid atmosphere. Suitable materials are now commercially available, for instance Millipore Filters sold by the Millipore Filter Corporation, Watertown, Massachusetts. Other filter materials suitable for removing micro organisms are also satisfactory.

From the foregoing general description, it will be appreciated that this invention is adapted to numerous embodiments. Of these, preferred embodiments selected for purposes of illustration are described in detail below with reference to the accompanying drawings in which:

Fig. 1 is a cross-sectional elevation of one embodiment of this invention showing also appropriate connections for introducing and removing samples to be tested;

Fig. 2 shows the parts of the embodiment in Fig. 1 in exploded relation;

Fig. 3 is a cross-sectional elevation of another embodiment of this invention;

Fig. 4 is a view in perspective, of a bottom member of the container partly broken away to reveal the structural details of certain features;

Fig. 5 is a perspective view of a supporting disk which may be used optionally in the various embodiments of this invention;

Figs. 6, 7 and 8 are perspective views of the bottom of the containers showing various optional features or improvements, and Figs. 9 and 10 are schematic diagrams suggestive of preferred methods of using the bacterial analysis unit of this invention.

In the embodiment shown in Figs. 1 and 2 the container 10 consists of a bottom tray 12 centrally tapped to provide an outlet port 14, and a removable close fitting cover 16 centrally tapped to provide an inlet port 18. Conveniently, the bottom tray 12 and cover 16 are formed with side wall sections 20—21 correspondingly tapered to provide a rather rigid and close fit. The outlet and inlet ports 14 and 18 are preferably formed as inwardly tapering bores in outer collars 22 and 24 which serve to facilitate the making of appropriate connections to the ports and to strengthen the structure. Conveniently, the cover 16 and bottom tray 12 are formed of a transparent plastic, such as polystyrene with the top of the cover 16 smooth and flat to permit visual observation of the interior, and in general the preferred container is constructed as described in U.S. Patent No. 2,677,647.

The filter film 26 is supported on the bottom tray 12 by a porous supporting pad 28, conveniently a circular piece of thick filter paper or felt which serves to provide drainage from the entire area beneath the film 26 to the outlet port 14, and serves also as a bibulous structure for absorbing a nutrient medium for culturing micro-organisms collected on the filter film.

The filter film 26 is conveniently held in place by an underlying resilient gasket ring 30, of for instance polychloroprene, surrounding the pad 28 and supporting the lower marginal edge of the film, and a cooperating frame 32 engaging the upper marginal edge of the film and extending upward into contact with the cover 16. The filter film 26 is thus held in assured contact with the supporting pad with the frame 32 providing side walls defining the filter area. Alternatively, however, the supporting pad may extend to the edges of the film 26 and provide the necessary support against which the frame presses the upper edges of the film.

In Fig. 3 is shown a modified embodiment in which the lower marginal edges of the filter film 26 are supported on a raised shoulder 40 formed as an integral part of the bottom tray 12, and the upper marginal edges are engaged by a downwardly extending flange 42 formed as an integral part of the cover 16. In this embodiment the flange 42 also serves as part of the side wall construction of the cover engaging the side wall 20 of the bottom tray 12, and these may also be correspondingly tapered to assure a tight fit.

For field work it may be desired that the container be more positively sealed than by the friction fit of the bottom tray 12 and cover 16, and for this purpose a band of pressure sensitive adhesive tape, e.g. a vinyl or cellulose tape, may be wrapped around the side walls 20—21 to prevent any possible opening and contamination of the unit. If a tape band is to be provided in this manner, the bottom tray 12 and cover 16 may be formed with abutting side walls, rather than with the tapered tightly fitting construction described with reference to Figs. 1, 2 and 3.

Where it is important that filtration be as uniform as possible over the area of the filter film, the bottom tray is preferably formed with radial grooves or flutes 46, such as shown in Fig. 4. These serve to provide additional drainage regions beneath the supporting pad 28 and to assure more uniform drainage from beneath the pad.

Another means of improving the drainage from beneath the filter film 26 is to replace the supporting pad 28 with a screen or with a fluted supporting disk, such as shown in Fig. 5. A suitable disk may be formed as a wafer 70 of glass having a central aperture 72 aligning with the outlet port 14, and formed with radial flutes 74 which serve to support the filter film 28, with adequate drainage space beneath it. If the pad is so replaced by a less bibulous structure such as a screen or fluted disk, it is advantageous during incubation to rest the unit upside down and introduce the culture medium directly onto the bottom of the filter film 26 through the outlet port 14.

Other more or less optional features which may be provided include supporting legs 48, as shown in Fig. 6, on the bottom of the bottom tray 12 to stabilize the unit against tipping about the bottom collar 22; an auxiliary or dummy collar 50, as shown in Fig. 7, formed on the cover 16 and bottom tray 12 to hold a tapered plug 51 for sealing the inlet and outlet ports during the incubation period; a roughened or frosted area 52, as shown in Fig. 8, on the bottom tray 12 on which pen or pencil markings to identify each sample may be made; and tabs 54 of a pressure sensitive tape stuck to the cover 16 and bottom tray 12 for sealing the inlet and outlet ports after the sample has been filtered.

The inlet and outlet ports 18 and 14 of the assembled unit are preferably sealed, as by tabs of a pressure sensitive tape or by plugs such as shown at 51 in Fig. 7, and the unit is then sterilized preliminary to use.

In using the bacterial analysis unit of this invention to provide bacterial cultures of samples tested, connections to the inlet and outlet ports 18 and 14 are conveniently made by tubular tapered fittings 56 and 58 of polyethylene or other material suitable for insuring a tight connection, inserted into the ports. A convenient technique for taking water samples, as suggested by Fig. 9, consists in connecting a tube 57 through a fitting 56 to the inlet port collar 24 and immersing the other end of the tube in the water to be tested. The outlet fitting 58 is then connected to a source of vacuum, to draw the sample through the unit and then to drain the unit, after which the fittings are removed, and a quantity of a culture medium necessary to saturate the supporting pad is introduced, as by a syringe, through the outlet port 14, and the ports are then sealed preliminary to incubation as by plugs 51 or pieces of pressure sensitive adhesive tape. A convenient means of applying the vacuum, particularly in field work, utilizes an evacuated bottle 60 (Fig. 9) having a soft rubber stopper which is penetrated by a hollow needle 62 connected to the outlet fitting 58.

Alternatively, a sample may be filtered by placing it in a soft flexible container 64 of e.g. rubber or polyethylene, which is connected to the inlet port 18, and squeezing the container to force the sample through the unit, as suggested by Fig. 10. In this procedure, no connection to the outlet port 14 is required.

The unit of this invention is adapted to numerous bacteriological analysis techniques. For instance, it may be used for the culture of both aerobic and anaerobic organisms. With aerobic organisms it is only necessary that the capacity of the container 10 between the filter film 26 and cover 16 be sufficient that the required amount of air will be present when the container is sealed. Where anaerobic organisms are to be grown, the unit may be flushed with nitrogen or carbon dioxide to remove the air, and then sealed. The unit may also be used advantageously with techniques requiring two or more successive culture media, for instance, it is frequent practice to employ first an enrichment medium, and then a differential medium, and this may be done by draining off the enrichment medium after incubation thereon, as by opening the inlet and outlet ports and applying a vacuum to the latter while supplying sterile air or other gas to the inlet, then introducing the differential medium in the ordinary manner.

It will be understood that the foregoing description is by way of illustration and that numerous modifications of the construction and utilization of the bacterial analysis unit of this invention readily occurring to those skilled in the art may be made without departing from the scope of this invention.

Having thus disclosed this invention and described in detail preferred embodiments thereof, I claim and desire to secure by Letters Patent:

1. A combined filtration and incubation unit for microorganism analysis comprising in combination an enclosed container comprising a transparent material permitting visual observation of the interior of said container, said container including a bottom portion having an outlet port and a top portion having an inlet port, a flat filter film capable of removing microorganisms positioned between said inlet and outlet ports, supporting structure for said filter film including a generally flat-surfaced bibulous supporting member underlying said filter film, said supporting structure providing drainage from beneath and substantially uniform filtration through said filter film and having liquid-holding capacity to contain sufficient nutrient medium to nourish microorganisms collected on said filter film, means engaging the marginal edge of said filter film to hold said filter film in substantial contact with said bibulous supporting member, the upper surface of said filter film being exposed to a space within said top portion having a volume sufficient to contain air to sustain aerobic microorganisms collected on said filter film, and removable sealing means sealing said outlet port and said inlet port.

2. A combined filtration and incubation unit as defined by claim 1 wherein the supporting structure includes channeling grooves formed in the bottom portion underlying the bibulous member and communicating with the outlet port.

3. A combined filtration and incubation unit for microorganism analysis comprising in combination: an enclosed container comprising a transparent material permitting visual observation of the interior of said container, said container including a bottom member formed with an outlet port and a close-fitting removable top member formed with an inlet port; a filter film capable of removing microorganisms positioned between said inlet and outlet ports; supporting structure for said filter film including a generally flat-surfaced bibulous supporting member underlying said filter film, said supporting structure providing drainage from beneath and substantially uniform filtration through said filter film and having liquid-holding capacity to contain sufficient nutrient medium to nourish microorganisms collected on said filter film; means engaging the marginal edge of said filter film to hold said filter film in substantial contact with said bibulous supporting member, the upper surface of said filter film being exposed to a space within said top member having a volume sufficient to contain air to sustain aerobic microorganisms collected on said filter film; and removable sealing means sealing said outlet port and said inlet port.

4. A combined filtration and incubation unit for microorganism analysis comprising in combination: an enclosed container comprising a transparent material permitting visual observation of the interior of said container, said container including a bottom member formed with a drainage port and having an upright circumferential surface, and a removable close-fitting top member formed with an inlet port and having a mating surface frictionally engaging said circumferential surface; a filter film capable of removing microorganisms positioned between said inlet and outlet ports; supporting structure for said filter film including a generally flat-surfaced bibulous supporting member underlying said filter film, said supporting structure providing drainage from beneath and substantially uniform filtration through said filter film and having liquid-holding capacity to contain sufficient nutrient medium to nourish microorganisms collected on said filter film; means engaging the marginal edge of said filter film to hold said filter film in substantial contact with said bibulous supporting member, the upper surface of said filter film being exposed to a space within said top portion having a volume sufficient to contain air to sustain aerobic microorganisms collected on said filter film; and removable sealing means sealing said outlet port and said inlet port.

5. A combined filtration and incubation unit for microorganism analysis comprising in combination an enclosed container comprising a transparent material permitting visual observation of the interior of said container, said container including a bottom portion having an outlet port and a top portion having an inlet port, a flat filter film capable of removing microorganisms positioned between said inlet and outlet ports, supporting structure for said filter film including a generally flat-surfaced bibulous supporting member underlying said filter film, said supporting structure providing drainage from beneath and substantially uniform filtration through said filter film and having liquid-holding capacity to contain sufficient nutrient medium to nourish microorganisms collected on said filter film, a rim member surrounding said supporting structure having a top surface underlying the marginal edge of said filter film and means engaging the upper marginal edge of said filter film to hold said filter film in substantial contact with said bibulous supporting member, the upper surface of said filter film being exposed to a space within said top portion having a volume sufficient to contain air to sustain aerobic microorganisms collected on said filter film, and removable sealing means sealing said outlet port and said inlet port.

6. A combined filtration and incubation unit for microorganism analysis comprising in combination: an enclosed container comprising a transparent material permitting visual observation of the interior of said container, said container including a bottom member formed with a drainage port and having an upright circumferential surface, and a removable close-fitting top member formed with an inlet port and having a mating surface frictionally engaging said circumferential surface; a filter film capable of removing microorganisms positioned between said inlet and outlet ports; supporting structure for said filter film including a generally flat-surfaced bibulous supporting member underlying said filter film, said supporting structure providing drainage from beneath and substantially uniform filtration through said filter film and having liquid-holding capacity to contain sufficient nutrient medium to nourish microorganisms collected on said filter film; a rim member integral with said bottom member surrounding said supporting structure having a top surface underlying the marginal edge of said filter film; means integral with said top member engaging the upper marginal edge of said filter film to hold said filter film in substantial contact with said bibulous supporting member, the upper surface of said filter film being exposed to a space within said top portion having a volume sufficient to contain air to sustain aerobic microorganisms collected on said filter film; and removable sealing means sealing said outlet port and said inlet port.

7. A combined filtration and incubation unit for microorganism analysis comprising in combination: an enclosed container comprising a transparent material permitting visual observation of the interior of said container, said container including a bottom member formed with an outlet port and a close-fitting removable top member formed with an inlet port; a filter film capable of removing microorganisms positioned between said inlet and outlet ports; supporting structure for said filter film including a generally flat-surfaced bibulous supporting member underlying said filter film, said supporting structure providing drainage from beneath and substantially uniform filtration through said filter film and having liquid-holding capacity to contain sufficient nutrient medium to nourish microorganisms collected on said filter film; a circular flange integral with said top member having a lower annular surface engaging the upper marginal edge of said filter film to hold said filter film in substantial contact with said bibulous supporting member, the upper surface of said filter film being exposed to a space within said top member having a volume sufficient to contain air to sustain aerobic microorganisms collected on said filter film; and removable sealing means sealing said outlet port and said inlet port.

8. The combined filtration and incubation unit as defined by claim 7 wherein the supporting structure includes channeling grooves formed in the bottom member underlying the bibulous member and communicating with the outlet port.

9. A combined filtration and incubation unit for microorganism analysis comprising in combination: an enclosed container formed of a transparent material permitting visual observation of the interior of said container, said container including a bottom member having a generally flat bottom surrounded by a raised rim having a flat upper surface and an upright side wall, and a close-fitting removable top member formed with a downwardly extending flange having a mating surface frictionally engaging said wall and an annular surface overlying said flat upper surface, an outlet port centrally situated in said bottom member and an inlet port centrally situated in said top member; a filter film capable of removing microorganisms engaged at its marginal edges between said flat upper surface and said annular surface; supporting structure for said filter film including a generally flat-surfaced bibulous supporting member underlying said filter film, said supporting member providing drainage from beneath and substantially uniform filtration through said filter film and having liquid holding capacity to contain sufficient nutrient medium to nourish microorganisms collected on said filter film, the upper surface of said filter film being exposed to a space within said top member having a volume sufficient to contain air to sustain aerobic microorganisms collected on said filter film; and removable sealing means sealing said outlet port and said inlet port.

10. The combined filtration and incubation unit as defined by claim 9 wherein the supporting structure includes channeling grooves formed in the bottom underlying the bibulous member and communicating with the outlet port.

References Cited in the file of this patent

UNITED STATES PATENTS

| | | | |
|---|---|---|---|
| 766,918 | Tousey | | Aug. 9, 1904 |
| 876,901 | Ernst et al. | | Jan. 14, 1908 |
| 1,472,896 | Alsop | | Nov. 6, 1923 |
| 1,595,344 | Lomax | | Aug. 10, 1926 |
| 2,073,991 | Koser | | Mar. 16, 1937 |
| 2,234,637 | Taggart | | Mar. 11, 1941 |
| 2,294,425 | Sanderson | | Sept. 1, 1942 |
| 2,389,185 | Dick | | Nov. 20, 1945 |
| 2,672,431 | Goetz | | Mar. 16, 1954 |
| 2,677,647 | Lovell | | May 4, 1954 |